Patented Mar. 20, 1934

1,951,814

UNITED STATES PATENT OFFICE 1,951,814

INSULATING ELEMENT FOR ELECTROLYTIC CELLS

Friedrich Weldes, Munich, Germany, assignor to Lawaczeck Gesellschaft mit beschrankter Haftung in Liquidation, of Berlin, Germany No Drawing. Application August 13, 1930, Serial No. 475,115. In Germany July 19, 1929

1 Claim. (Cl. 204—5)

The insulating material hitherto used in electrolyzers, especially those for the production of hydrogen and oxygen at high or low pressures, are unstable towards hot, concentrated alkali. This is due to the fact that, previously, the insulation material consisted of resins or cellulose lacquers, which substances are chemically decomposed by hot, concentrated alkalis.

According to the present invention, compounds, such as ethyl and benzyl cellulose, whose manufacture and use is of recent origin, are used for the manufacture of insulation. Experiments have shown these compounds to be very stable towards hot, concentrated alkalis and acids. They are therefore suitable for the manufacture of walls, frames and other parts of electrolytic cells which must be made from non-conducting material, such as sheets, wires, rings, gauze, gratings and perforated plates.

The cost of manufacturing the parts is considerably reduced if asbestos having the desired physical form, or like substances, are soaked in cellulose-ether solutions (lacquers) and subsequently dried. Soaking, however, does not afford a thorough penetration, there being always an inner core which contains no lacquer. That is to say, during drying, the lacquer substance is always drawn out by the dried outer layer, so that even when soaked for an extended period of time, an inner core containing no lacquer results.

The process by means of which this disadvantage is overcome consists in that, according to the present invention, for the production of lacquers, for example ethyl or benzyl cellulose in solid form or in solution (as ether lacquers) are mixed with inorganic filling materials. As such filling materials, cheap, raw alkali-resistant materials may be used. Among these are asbestos wool, asbestos meal, ground shale or the like. These are incorporated with the lacquer in proportions to be determined for each individual case. In this manner, a new material is obtained, which may now be used for the manufacture of the insulated parts of electrolytic cells. According to the invention, the said parts should be thin, thus preventing entirely or substantially the separation of the constituents. The peculiarity of the new material enables these parts to be made easily into similar parts of any desired thickness and form, by welding as it were the thin sections together. This is accomplished very simply by superficially softening the sections by means of a suitable solvent and subsequently combining them one upon the other. The material is made specially compact and strong by subjecting the combined sections to heat and pressure.

Thick parts may be manufactured from a large number of these thin sections by superficially softening the latter with solvents and subsequently combining them one upon the other or by pressing with the application of heat.

Shaped parts of metal (for example, sheets, wire rings gauze, etc.) may also be coated with pure lacquer foil. The coating is rendered impervious to penetration of liquid by hot pressing. In order to obtain satisfactory adhesion, foil which is not quite dry must be used or the dried foil must be softened superficially by solvent. The residual solvent is then expelled by long-continued heating in the press or even in alkali solutions under a high pressure, whence a very compact insulating element of high strength and elasticity is obtained.

I claim:

In an electrolytic cell, electrical insulating parts constructed of a substance selected from the class consisting of ethyl and benzyl cellulose ethers admixed with a mineral filler selected from the class consisting of asbestos wool, asbestos meal and ground shale, which insulated parts are resistant to hot concentrated alkali, and possess high strength and elasticity.

FRIEDRICH WELDES.